United States Patent
Li et al.

(10) Patent No.: US 12,117,695 B2
(45) Date of Patent: Oct. 15, 2024

(54) LIQUID CRYSTAL LENS PANEL AND DISPLAY DEVICE

(71) Applicant: BOE Technology Group Co., Ltd., Beijing (CN)

(72) Inventors: Lin Li, Beijing (CN); Pengxia Liang, Beijing (CN); Zhongxiao Li, Beijing (CN); Weili Zhao, Beijing (CN); Tao Hong, Beijing (CN); Jinye Zhu, Beijing (CN); Jing Yu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/273,557

(22) PCT Filed: Dec. 27, 2021

(86) PCT No.: PCT/CN2021/141733
§ 371 (c)(1),
(2) Date: Jul. 21, 2023

(87) PCT Pub. No.: WO2023/122898
PCT Pub. Date: Jul. 6, 2023

(65) Prior Publication Data
US 2024/0085742 A1    Mar. 14, 2024

(51) Int. Cl.
G02F 1/1337      (2006.01)
G02B 30/22       (2020.01)
(Continued)

(52) U.S. Cl.
CPC ....... *G02F 1/133761* (2021.01); *G02B 30/22* (2020.01); *G02F 1/133526* (2013.01); *G02F 1/134309* (2013.01)

(58) Field of Classification Search
None
See application file for complete search history.

(56) References Cited

U.S. PATENT DOCUMENTS

| 6,512,563 B1 * | 1/2003 | Tajima | G02F 1/133753 |
| | | | 359/254 |
| 2010/0099211 A1 * | 4/2010 | Yang | G02F 1/133753 |
| | | | 438/30 |

(Continued)

FOREIGN PATENT DOCUMENTS

| CN | 102591088 A | 7/2012 |
| CN | 102830568 A | 12/2012 |

(Continued)

OTHER PUBLICATIONS

International Search Report for PCT/CN2021/141733 Mailed Jul. 13, 2022.

*Primary Examiner* — Ryan Crockett
(74) *Attorney, Agent, or Firm* — Ling Wu; Stephen Yang; Ling and Yang Intellectual Property

(57) ABSTRACT

The present invention provides a liquid crystal lens panel and a display device. The liquid crystal lens panel comprises a first substrate (10) and a second substrate (20) that are opposite to each other, and a liquid crystal layer (30) provided between the first substrate (10) and the second substrate (20); the first substrate (10) comprises a first structural layer (12) provided on a first base (11) and a first orientation layer (13) provided on the first structural layer (12); the second substrate (20) comprises a second structural layer (22) provided on a second base (21) and a second orientation layer (23) provided on the second structural layer (22); on a plane parallel to the liquid crystal lens panel, at least one of the first orientation layer (13) and the second orientation layer (23) comprises multiple orientation areas, orientation pretilt angles of at least two orientation areas are different.

14 Claims, 5 Drawing Sheets

(51) Int. Cl.
   *G02F 1/1335*   (2006.01)
   *G02F 1/1343*   (2006.01)

(56)  References Cited

U.S. PATENT DOCUMENTS

| | | | | |
|---|---|---|---|---|
| 2012/0320288 A1* | 12/2012 | Baek | ................ | G02B 30/27 |
| | | | | 349/200 |
| 2015/0002800 A1* | 1/2015 | Tashiro | ............ | G02F 1/133753 |
| | | | | 349/124 |
| 2016/0209704 A1* | 7/2016 | Sugita | ............... | G02F 1/133528 |

FOREIGN PATENT DOCUMENTS

| | | |
|---|---|---|
| CN | 102830568 B | 8/2016 |
| CN | 109683422 A | 4/2019 |
| CN | 109870864 A | 6/2019 |
| JP | 2010091828 A | 4/2010 |

\* cited by examiner

LIQUID CRYSTAL LENS PANEL AND DISPLAY DEVICE

CROSS-REFERENCE TO RELATED APPLICATION

The present application is a U.S. National Phase Entry of International Application No. PCT/CN2021/141733 having an international filing date of Dec. 27, 2021, the content of which is incorporated into this application by reference.

TECHNICAL FIELD

The present disclosure relates to, but is not limited to the field of display technologies, specifically to a liquid crystal lens panel and a display apparatus.

BACKGROUND

Naked-eye Three Dimensional (3D) display has gradually become a research hot spot, and it is considered as a next generation display mode. At present, one implementation of the naked-eye 3D display is to superimpose a liquid crystal microlens array in front of a display panel, which uses refraction of lens to achieve an image separation, and projects corresponding images of the left eye and the right eye into the left eye and the right eye respectively, so that a viewer sees a 3D image. Since naked-eye 3D display of the liquid crystal microlens array type can make full use of electronically controlled zoom characteristics of the liquid crystal microlens array, an imaging effect is relatively good, it can better present rich information in a 3D scene, and has a continuous visual angle and a sense of spatial depth, and can better conform to a viewing habit of human eyes.

SUMMARY

The following is a summary of subject matters described herein in detail. The summary is not intended to limit the protection scope of claims.

In one aspect, an exemplary embodiment of the present disclosure provides a liquid crystal lens panel, including a first substrate and a second substrate disposed oppositely, and a liquid crystal layer disposed between the first substrate and the second substrate, wherein the first substrate includes a first structural layer disposed at a side of a first base substrate facing the second substrate and a first alignment layer disposed at a side of the first structural layer away from the first base substrate, and the second substrate includes a second structural layer disposed at a side of a second base substrate facing the first substrate and a second alignment layer disposed at a side of the second structural layer away from the second base substrate; at least one of the first alignment layer and the second alignment layer includes multiple alignment regions on a plane parallel to the liquid crystal lens panel, wherein at least two alignment regions have different alignment pretilt angles.

In an exemplary implementation, the multiple alignment regions include multiple alignment rows sequentially disposed along a vertical direction, wherein at least two of the multiple alignment rows have different alignment pretilt angles, and the vertical direction is a vertical direction of the liquid crystal lens panel when being viewed by a viewer.

In an exemplary implementation, at least two alignment rows are disposed symmetrically with respect to a first reference line, wherein absolute values of alignment pretilt angles of the two alignment rows are same; the first reference line is a straight line extending along a horizontal direction and passing through a center point of the panel, wherein the center point of the panel is a geometric center of the liquid crystal lens panel.

In an exemplary implementation, an absolute value of an alignment pretilt angle of an alignment row is directly proportional to a first distance, the first distance is a distance between a first center line of the alignment row and the first reference line, and the first center line is a straight line that bisects the alignment row in the vertical direction and extends along the horizontal direction.

In an exemplary implementation, an alignment pretilt angle of an alignment row located above the first reference line is greater than 0°, an alignment pretilt angle of an alignment row located below the first reference line is less than 0°, and an alignment pretilt angle of an alignment row located on the first reference line is 0.1° to 1°.

In an exemplary implementation, the absolute value of the orientation pretilt angle is less than or equal to 6°.

In an exemplary implementation, the first structural layer includes a first electrode layer disposed at a side of the first base substrate facing the second substrate and a first insulating layer disposed at a side of the first electrode layer away from the first base substrate; the second structural layer includes a second electrode layer disposed at a side of the second base substrate facing the first substrate; the first electrode layer is a strip electrode, and the second electrode layer is a surface electrode.

In an exemplary implementation, on a plane parallel to the liquid crystal lens panel, the first insulating layer includes multiple repetitive units arranged regularly, wherein at least one repetitive unit includes multiple insulating regions, at least two of which have different dielectric constants.

In an exemplary implementation, the repetitive unit includes a first insulating region, a second insulating region, and a third insulating region, wherein the first insulating region is configured to perform compensation for dispersion characteristics of a liquid crystal lens corresponding to the first insulating region when light rays of a first wavelength passes through the liquid crystal layer, the second insulating region is configured to perform compensation for dispersion characteristics of a liquid crystal lens corresponding to the second insulating region when light rays of a second wavelength passes through the liquid crystal layer, and the third insulating region is configured to perform compensation for dispersion characteristics of a liquid crystal lens corresponding to the third insulating region when light rays of a third wavelength passes through the liquid crystal layer, so that liquid crystal lenses corresponding to the three insulating regions have a same focal length.

In an exemplary implementation, the first wavelength is greater than the second wavelength, and the second wavelength is greater than the third wavelength; the first insulating region has a first dielectric constant, the second insulating region has a second dielectric constant, and the third insulating region has a third dielectric constant, wherein the first dielectric constant is greater than the second dielectric constant, and the second dielectric constant is greater than the third dielectric constant.

In an exemplary implementation, the first wavelength is 605 nm to 700 nm, and the first dielectric constant is 5 to 6.

In an exemplary implementation, the second wavelength is 505 nm to 600 nm, and the second dielectric constant is 3.0 to 3.5.

In an exemplary implementation, the third wavelength is 400 nm to 500 nm, and the third dielectric constant is 1.5 to 2.0.

In another aspect, an exemplary embodiment of the present disclosure also provides a display apparatus, including a display panel and the aforementioned liquid crystal lens panel.

In an exemplary implementation, the display panel includes multiple pixel units arranged regularly, wherein at least one pixel unit includes a first sub-pixel that emits light rays of a first color, a second sub-pixel that emits light rays of a second color, and a third sub-pixel that emits light rays of a third color, and in a repetitive unit of the liquid crystal lens panel, a first insulating region corresponds to a position of the first sub-pixel, a second insulating region corresponds to a position of the second sub-pixel, and a third insulating region corresponds to a position of the third sub-pixel.

Other aspects may be understood upon reading and understanding the drawings and detailed description.

BRIEF DESCRIPTION OF DRAWINGS

The drawings are intended to provide a further understanding of technical solutions of the present disclosure and form a part of the specification, and are used to explain the technical solutions of the present disclosure together with embodiments of the present disclosure, and do not form limitations on the technical solutions of the present disclosure. Shapes and sizes of various components in the drawings do not reflect actual scales, but are only intended to schematically illustrate contents of the present disclosure.

Figure 1:
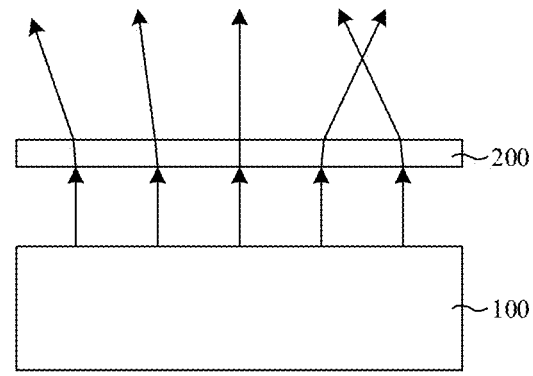
FIG. 1 is a schematic diagram of a structure of a display apparatus.

DESCRIPTION OF REFERENCE SIGNS 10-first substrate;
11-first base substrate;
12-first structural layer;
13-first alignment layer;
20-second substrate;
21-second base substrate;
22-second structural layer;
23-second alignment layer;
30-liquid crystal layer;
31-first alignment row;
32-second alignment row;
33-third alignment row;
34-fourth alignment row;
35-fifth alignment row;
60-repetitive unit;
70-pixel island;
80-columnar lens;
100-display panel;
121-first electrode layer;
122-first insulation layer;
131-first insulating region;
132-second insulating region;
133-third insulating region;
200-liquid crystal lens panel;
221-second electrode layer;
301-array substrate;
302-color filter substrate;
303-display liquid crystal layer.

DETAILED DESCRIPTION

To make objectives, technical solutions, and advantages of the present disclosure clearer, the embodiments of the present disclosure will be described in detail with reference to the accompanying drawings. It is to be noted that implementations may be implemented in multiple different forms. Those of ordinary skills in the art may easily understand such a fact that implementations and contents may be transformed into various forms without departing from the purpose and scope of the present disclosure. Therefore, the present disclosure should not be explained as being limited to contents described in following implementations only. The embodiments and features in the embodiments in the present disclosure may be combined randomly with each other without a conflict. In order to keep the following description of the embodiments of the present disclosure clear and concise, detailed descriptions for a part of known functions and known components are omitted in the present disclosure. The drawings in the embodiments of the present disclosure relate only to the structures involved in the embodiments of the present disclosure, and other structures may be described with reference to conventional designs.

Scales of the drawings in the present disclosure may be used as a reference in the actual process, but are not limited thereto. For example, a width-length ratio of a channel, a thickness and spacing of each film layer, and a width and spacing of each signal line may be adjusted according to actual needs. A quantity of pixels in the display substrate and a quantity of sub-pixels in each pixel are not limited to the quantities shown in the drawings. The drawings described in the present disclosure are schematic structure diagrams only, and one implementation of the present disclosure is not limited to the shapes, numerical values or the like shown in the drawings.

Ordinal numerals such as "first", "second", and "third" in the specification are set to avoid confusion of constituent elements, but not set to make a limit in quantity.

In the specification, for convenience, wordings indicating alignment or positional relationships, such as "middle", "upper", "lower", "front", "back", "vertical", "horizontal", "top", "bottom", "inside", and "outside", are used for illustrating positional relationships between constituent elements with reference to the drawings, and are merely for facilitating the description of the specification and simplifying the description, rather than indicating or implying that a referred apparatus or element must have a particular alignment and be constructed and operated in the particular alignment. Therefore, they cannot be understood as limitations on the present disclosure. The positional relationships between the constituent elements may be changed as appropriate according to directions for describing the various constituent elements. Therefore, appropriate replacements may be made according to situations without being limited to the wordings described in the specification.

In the specification, unless otherwise specified and defined explicitly, terms "mount", "mutually connect", and "connect" should be understood in a broad sense. For example, it may be a fixed connection, or a detachable connection, or an integrated connection. It may be a mechanical connection or an electrical connection. It may be a direct connection, or an indirect connection through middleware, or internal communication between two components. Those of ordinary skills in the art may understand specific meanings of these terms in the present disclosure according to specific situations.

In the specification, a transistor refers to a component which at least includes three terminals, i.e., a gate electrode, a drain electrode and a source electrode. The transistor has a channel region between the drain electrode (drain electrode terminal, drain region, or drain) and the source electrode (source electrode terminal, source region, or source), and a current can flow through the drain electrode, the channel region, and the source electrode. It is to be noted that, in the specification, the channel region refers to a region through which the current mainly flows.

In the specification, a first electrode may be a drain electrode, and a second electrode may be a source electrode. Or, the first electrode may be a source electrode, and the second electrode may be a drain electrode. In cases that transistors with opposite polarities are used, a current direction changes during operation of a circuit, or the like, functions of the "source electrode" and the "drain electrode" are sometimes interchangeable. Therefore, the "source electrode" and the "drain electrode" are interchangeable in the specification.

In the specification, "electrical connection" includes a case that constituent elements are connected together through an element with a certain electrical effect. The "element with a certain electrical effect" is not particularly limited as long as electrical signals may be sent and received between the connected constituent elements. Examples of the "element with the certain electrical effect" not only include electrodes and wirings, but also include switch elements (such as transistors), resistors, inductors, capacitors, other elements with various functions, etc.

In the specification, "parallel" refers to a state in which an angle formed by two straight lines is −10° or more than −10° and 10° or lower than 10°, and thus also includes a state in which the angle is −5° or more than −5° and 5° or lower than 5°. In addition, "perpendicular" refers to a state in which an angle formed by two straight lines is 80° or more than 80° and 100° or less than 100°, and thus also includes a state in which the angle is 85° or more than 85° and 95° or more than 95°.

In the specification, a "film" and a "layer" are interchangeable. For example, a "conductive layer" may be replaced with a "conductive film" sometimes. Similarly, an "insulating film" may be replaced with an "insulating layer" sometimes.

In this specification, "being disposed in a same layer" refers to a structure formed by patterning two (or more than two) structures in the same patterning process, and their materials may be the same or different. For example, the materials of the precursors forming multiple structures disposed in a same layer are the same, and the resulting materials may be the same or different.

Triangle, rectangle, trapezoid, pentagon and hexagon, etc. in this specification are not strictly defined, and they may be approximate triangle, rectangle, trapezoid, pentagon or hexagon, etc. There may be some small deformations caused by tolerance, and there may be chamfer, arc edge and deformation, etc.

In the present disclosure, "about" refers to that a boundary is defined not so strictly and numerical values within process and measurement error ranges are allowed.

FIG. 1 is a schematic diagram of a structure of a display apparatus. As shown in FIG. 1, the display apparatus may include a display panel 100 and a liquid crystal lens panel 200 disposed at a light-emitting side of the display panel 100, wherein the display panel 100 is configured to perform image display, and the liquid crystal lens panel 200 is configured to modulate light rays emitted out from the display panel 100 according to a set mode to achieve 2D display or 3D display.

In an exemplary implementation, the display apparatus may achieve display of a first mode and display of a second mode. When display of the first mode is performed, the liquid crystal lens panel 200 does not modulate the light rays emitted out from the display panel 100, so that the display apparatus achieves the 2D display. When display of the second mode is performed, the liquid crystal lens panel 200 modulates a path or a phase of the light rays emitted out from the display panel 100, so that the display apparatus achieves the 3D display. This mode-based selective modulation can make that the display apparatus can achieve switching between the 2D display and the 3D display.

In an exemplary implementation, the display panel may be a self-luminous display panel, or may be a non-self-luminous display panel including a backlight module. The display panel may include any one or more of the following: Liquid Crystal Display (LCD), Organic Light Emitting Diode (OLED), Light Emitting Diode (LED), Inorganic Electro Luminescent Display (EL), Field Emission Display (FED), Surface-conduction Electron-emitter Display (SED), a Plasma Display Panel (PDP), Electro Phoretic Display (EPD).

Figure 2:
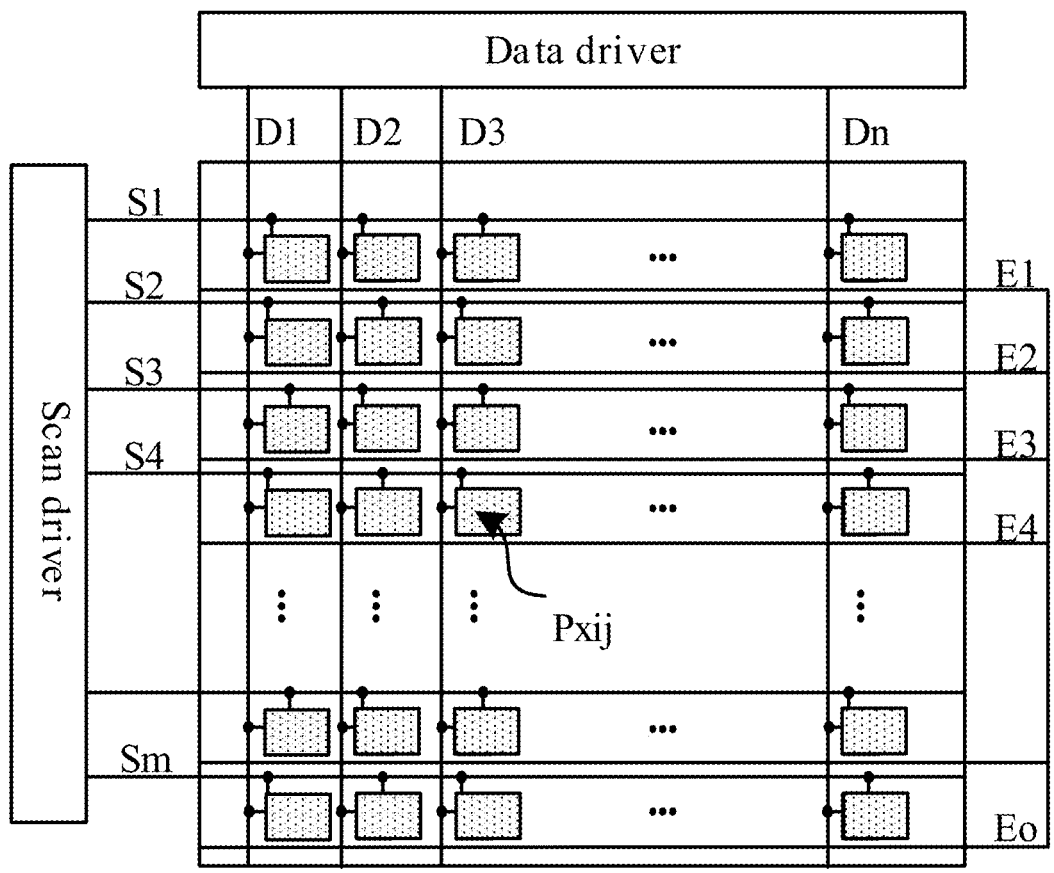
FIG. 2 is a schematic diagram of a structure of a liquid crystal display panel.

FIG. 2 is a schematic diagram of a structure of a liquid crystal display panel. As shown in FIG. 2, in an exemplary implementation, the liquid crystal display panel may include a display region and a border region. The display region may include multiple gate lines (S1 to Sm) and multiple data lines (D1 to Dn), the multiple gate lines may extend along a horizontal direction and be sequentially disposed along a vertical direction, the multiple data lines may extend along the vertical direction and sequentially disposed along the horizontal direction, and the multiple gate lines and the multiple data lines intersecting each other define multiple sub-pixels Pxij regularly arranged, and m, n, i, and j may be natural numbers. In an exemplary implementation, at least one sub-pixel Pxij may include a thin film transistor, a pixel electrode, and a common electrode, wherein the thin film transistor is connected with a gate line, a data line, and a pixel electrode, respectively.

In an exemplary implementation, the display region may also include multiple common electrode lines (E1 to Eo), wherein the multiple common electrode lines may extend along the horizontal direction and be sequentially disposed along the vertical direction, and the multiple common electrode lines are connected correspondingly with common electrodes in the multiple sub-pixels Pxij.

In an exemplary implementation, the multiple gate lines are led out to a bezel region and connected with a scan driver, and the multiple data lines are led out to the bezel region and connected with a data driver, wherein at least a part of the scan driver and the data driver may be formed on a substrate.

In an exemplary implementation, an external control apparatus (such as a timing controller) may provide a gray scale value and a control signal suitable for a specification of the data driver to the data driver, and the data driver may utilize the gray scale value and the control signal that are received, to generate a data voltage to be provided to the data lines D1, D2, D3, . . . , and Dn. For example, the data driver may sample the gray scale value by using a clock signal, and apply a data voltage corresponding to the gray scale value to the data signal lines D1 to Dn by taking a pixel row as a unit. The external control apparatus may provide a clock signal, a scan start signal, and the like suitable for a specification of the scan driver to the scan driver, and the scan driver may utilize the clock signal, the scan start signal, and the like to generate a scan signal to be provided to the scan signal lines S1, S2, S3, . . . , and Sm. For example, the scan driver may provide a scan signal with an on-level pulse to the scan signal lines S1 to Sm sequentially. For example, the scan driver may be constructed in a form of a shift register, and may sequentially transmit a scan start signal provided in a form of an on-level pulse to a next-stage circuit under control of a clock signal to generate a scan signal.

Figure 3:
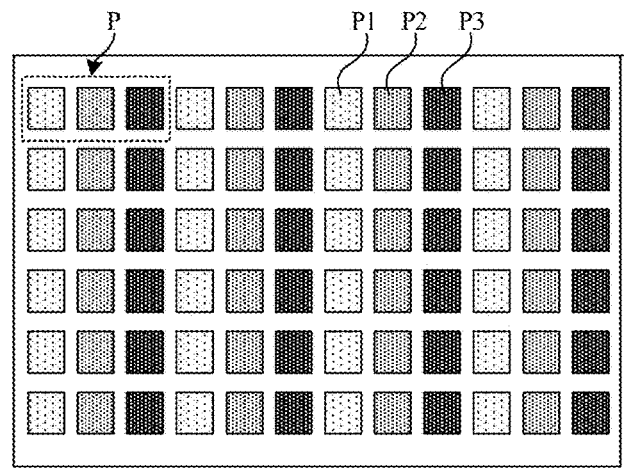
FIG. 3 is a schematic diagram of a planar structure of a liquid crystal display panel.

FIG. 3 is a schematic diagram of a planar structure of a liquid crystal display panel. As shown in FIG. 3, the display panel may include multiple pixel units P arranged regularly, wherein at least one of the multiple pixel units P may include a first sub-pixel P1 that emits light rays of a first color, a second sub-pixel P2 that emits light rays of a second color, and a third sub-pixel P3 that emits light rays of a third color, and the three sub-pixels may each include a thin film transistor, a pixel electrode, and a common electrode. In an exemplary implementation, the first sub-pixel P1 may be a red sub-pixel that emits red (R) light rays, the second sub-pixel P2 may be a green sub-pixel that emits green (G) light rays, the third sub-pixel P3 may be a blue sub-pixel that emits blue (B) light rays, a shape of sub-pixels in a pixel unit may be a rectangular shape, a diamond shape, a pentagonal shape, or a hexagonal shape, etc., and the sub-pixels in the pixel unit may be arranged side by side horizontally, side by side vertically, or in mode like a Chinese character "品", which is not limited in the present disclosure. In an exemplary implementation, the pixel unit may include four sub-pixels, which is not limited in the present disclosure.

Figure 4:
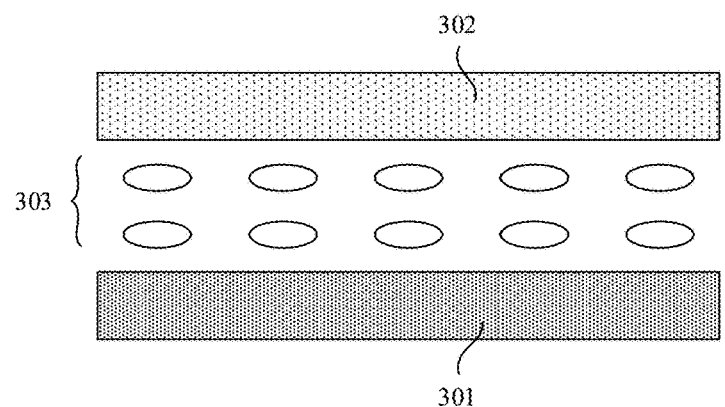
FIG. 4 is a schematic diagram of a sectional structure of a liquid crystal display panel.

FIG. 4 is a schematic diagram of a sectional structure of a liquid crystal display panel. As shown in FIG. 4, the liquid crystal display panel may include a Thin Film Transistor (TFT) array substrate 301 and a Color Filter (CF) substrate 302 that are disposed in CELL, and a display Liquid Crystal (LC) layer 303 disposed between the array substrate 301 and the Color Filter substrate 302, and an electric field that drives a deflection of a liquid crystal is formed by controlling the common electrode and the pixel electrode to achieve gray scale display. In an exemplary implementation, according to a display mode, the liquid crystal display panel may be divided into a Twisted Nematic (TN) display mode, a Vertical Alignment (VA) display mode, an In Plane Switching (IPS) display mode, a Fringe Field Switching (FFS) display mode, and an Advanced Super Dimension Switch (ADS) display mode, etc. For a horizontal electric field type ADS display mode, the array substrate 301 may include a gate line, a data line, a thin film transistor, a pixel electrode, and a common electrode, and the color filter substrate 302 may include a black matrix and a filtering layer.

In an exemplary implementation, the liquid crystal panel also includes a first polarizing plate, a second polarizing plate, and a backlight source. The first polarizing plate may be disposed at a side of the array substrate 301 away from the color filter substrate 302, the second polarizing plate may be disposed at a side of the color filter substrate 302 away from the array substrate 301, a light transmission axis of the first polarizing plate and a light transmission axis of the second polarizing plate are perpendicular to each other, and light rays emitted out by the backlight source are emitted out by subsequently passing through the first polarizing plate, the array substrate, the liquid crystal layer, the color filter substrate, and the second polarizing plate. In a case where no voltage is applied, the liquid crystal layer does not play a twisting role for the light rays, a polarizing direction of the light rays after passing through the first polarizing plate and the liquid crystal is perpendicular to a direction of the light transmission axis of the second polarizing plate, and the light rays cannot be transmitted, so that a dark picture is displayed, and the display panel is in a dark state. In a case where a voltage is applied, liquid crystal molecules spin to twist the light rays, changing a polarizing direction of the light rays, so that the light rays can be emitted out through the second polarizing plate, thereby a bright picture is displayed, and the display panel is in a bright state.

Figure 5:
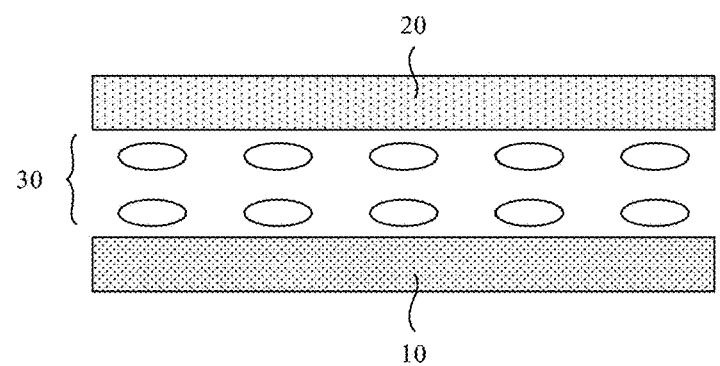
FIG. 5 is a schematic diagram of a structure of a liquid crystal lens panel.

FIG. 5 is a schematic diagram of a structure of a liquid crystal lens panel. As shown in FIG. 5, the liquid crystal lens panel may include a first substrate 10 and a second substrate 20 disposed oppositely, and a liquid crystal layer 30 disposed between the first substrate 10 and the second substrate 20. In an exemplary implementation, the first substrate 10 may include a first electrode layer and a first alignment layer disposed on a first base substrate, and the second substrate 20 may include a second electrode layer and a second alignment layer disposed on a second base substrate. The first electrode layer and the second electrode layer are respectively configured to form a predetermined electric field between the first electrode layer and the second electrode layer, so that the liquid crystal layer 30 forms a liquid crystal lens. The first alignment layer and the second alignment layer are respectively disposed at two sides of the liquid crystal layer 30, and are configured to make liquid crystal molecules in the liquid crystal layer 30 have an initial posture.

Figure 6:
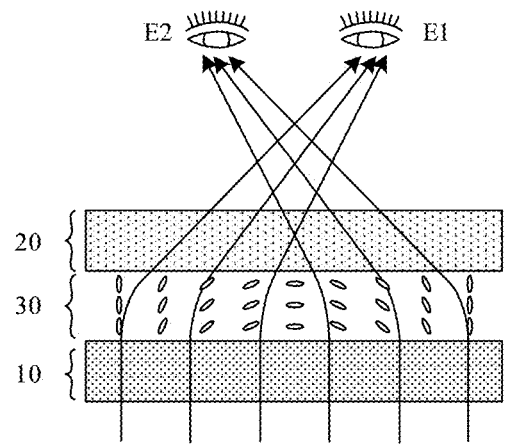
FIG. 6 is a working schematic diagram of a liquid crystal lens panel.

FIG. 6 is a working schematic diagram of a liquid crystal lens panel. By applying corresponding voltages to the first electrode layer and the second electrode layer, deflection degrees of liquid crystal molecules at different positions in the liquid crystal layer are different, and a liquid crystal lens is formed to change a propagation direction of light rays after being transmitted through the liquid crystal layer.

In an exemplary implementation, the liquid crystal molecules in the liquid crystal layer have optical birefringence characteristics, that is, the liquid crystal molecules optically have two refractive indices, including an ordinary ray refractive index no for light in a long axis direction and an extraordinary ray refractive index ne for light in a short axis direction, wherein the ordinary ray refractive index no may be less than the extraordinary ray refractive index ne. For example, the ordinary ray refractive index no of the liquid crystal molecules may be about 1.5, while the extraordinary ray refractive index ne of the liquid crystal molecules may be about 1.7. Therefore, if the liquid crystal molecules are arranged horizontally, the liquid crystal layer has the extraordinary ray refractive index ne, of which refractive index is relatively large, and if the liquid crystal molecules are rotated to a vertical direction, the liquid crystal layer has the ordinary ray refractive index no, of which refractive index becomes relatively small. Since a propagation speed of light rays is relatively slow in a material with a relatively high refractive index and relatively fast in a material with a relatively low refractive index, when the light rays propagates in the liquid crystal layer with different refractive indices, a path of the light rays will bend from a liquid crystal region with a relatively low refractive index to a liquid crystal region with a relatively high refractive index, showing a propagation path of the light rays shown in FIG. 6.

In an exemplary implementation, the propagation path of the light rays shown in FIG. 6 is substantially similar to a propagation path of light rays passing through a convex lens, and the liquid crystal layer has optical characteristics similar to the convex lens. As shown in FIG. 6, after light rays from a display panel passes through a left region of a liquid crystal lens panel, a light path of the light rays will be modulated to bend to the right and enter the right eye E1 of a viewer, and after light rays from the display panel passes through the right region of the liquid crystal lens panel, a light path of the light rays will be modulated to bend to the left and enter the left eye E2 of the viewer, so that the viewer can watch a three-dimensional image.

It is found in the research that in a liquid crystal lens panel with an existing structure, visual angle characteristics will cause a decreased imaging effect. The visual angle characteristics mean that when the viewer's viewing position is located on a sight central line of a panel, the viewer's sight line at an edge position of the panel forms a certain included angle with the central sight line of the panel. The sight central line of the panel is a straight line perpendicular to a plane of the panel and passing through a central point of the panel, and the central point of the panel may be a geometric center of the liquid crystal lens panel.

Figure 7:
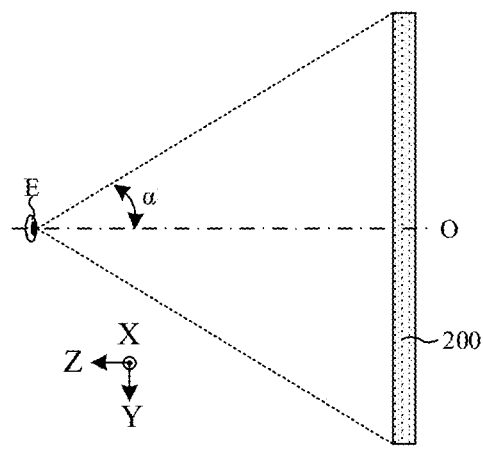
FIG. 7 is a schematic diagram of vertical visual angle characteristics.

FIG. 7 is a schematic diagram of vertical visual angle characteristics, taking the viewer's eye E located at a sight central line O of the liquid crystal lens panel 200 as an example. When the viewer views an image at a center point position of the panel, the viewer's sight line overlaps with the center sight line O of the panel, so the viewer views the image at a visual angle of 0, and there is no visual angle characteristics. When the viewer views images at the upper and lower edge positions of the panel in a vertical direction Y, the viewer's sight line and the center sight line O of the panel have an included angle α, so the viewer views images at the upper and lower edge positions of the panel with a vertical visual angle α, as shown in FIG. 7. With an increase of a panel size, the vertical visual angle will increase continuously, and since a focal length of a liquid crystal lens is designed according to a situation of a visual angle being 0°, when the vertical visual angle is relatively large, liquid crystals in a same arrangement state will show different refractive indices, which makes the focal length of the liquid crystal lens appear a relatively great deviation under a large visual angle, and a relatively great deformation occurs in an equivalent surface shape of the liquid crystal lens, which deviates greatly from a focal length and an equivalent surface shape that are initially designed, thus resulting in that a 3D imaging effect becomes poor.

In the present disclosure, the vertical direction Y refers to a vertical direction from top to bottom or from bottom to top of the liquid crystal lens panel when the liquid crystal lens panel is viewed by a viewer's eye E, and a horizontal direction X refers to a horizontal direction from left to right or from right to left of the liquid crystal lens panel when the liquid crystal lens panel is viewed by the viewer's eye E, and a viewing direction Z is a direction perpendicular to a plane of the liquid crystal lens panel.

An exemplary embodiment of the present disclosure provides a liquid crystal lens panel, including a first substrate and a second substrate disposed oppositely, and a liquid crystal layer disposed between the first substrate and the second substrate. The first substrate includes a first structural layer disposed at a side of a first base substrate facing the second substrate and a first alignment layer disposed at a side of the first structural layer away from the first base substrate, and the second substrate includes a second structural layer disposed at a side of a second base substrate facing the first substrate and a second alignment layer disposed at a side of the second structural layer away from the second base substrate. At least one of the first alignment layer and the second alignment layer includes multiple alignment regions on a plane parallel to the liquid crystal lens panel, wherein at least two alignment regions have different alignment pretilt angles.

In an exemplary implementation, the multiple alignment regions include multiple alignment rows sequentially disposed along a vertical direction, wherein at least two of the multiple alignment rows have different alignment pretilt angles, and the vertical direction is a vertical direction of the liquid crystal lens panel when being viewed by a viewer.

In an exemplary implementation, the first structural layer includes a first electrode layer disposed at a side of a first base substrate facing the second substrate, and a first insulating layer disposed at a side of the first electrode layer away from the first base substrate; the second structural layer includes a second electrode layer disposed at a side of a second base substrate facing the first substrate; the first electrode layer is a strip electrode, and the second electrode layer is a surface electrode.

In an exemplary implementation, on a plane parallel to the liquid crystal lens panel, the first insulating layer includes multiple repetitive units arranged regularly, wherein at least one repetitive unit includes multiple insulating regions, at least two of which have different dielectric constants.

Figure 8:
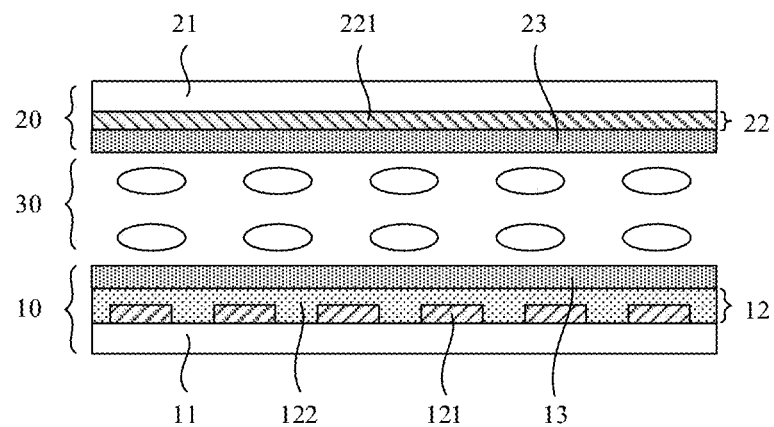
FIG. 8 is a schematic diagram of a structure of a liquid crystal lens panel according to an exemplary embodiment of the present disclosure.

FIG. 8 is a schematic diagram of a structure of a liquid crystal lens panel according to an exemplary embodiment of the present disclosure. As shown in FIG. 8, the liquid crystal lens panel may include a first substrate 10 and a second substrate 20 disposed oppositely, and a liquid crystal layer 30 disposed between the first substrate 10 and the second substrate 20. The first substrate 10 may include a first base substrate 11, a first structural layer 12 disposed at a side of the first base substrate 11 facing the second substrate 20, and a first alignment layer 13 disposed at a side of the first structural layer 12 away from the first base substrate 11, and the second substrate 20 may include a second base substrate 21, a second structural layer 22 disposed at a side of the second base substrate 21 facing the first substrate 10, and a second alignment layer 23 disposed at a side of the second structural layer 22 away from the second base substrate 21.

In an exemplary implementation, the first structural layer 12 may include a first electrode layer 121 disposed at a side of the first base substrate 11 facing the second substrate 20 and a first insulation layer 122 disposed at a side of the first electrode layer 121 away from the first base substrate 11, and the first alignment layer 13 is disposed at a side of the first insulation layer 122 away from the first base substrate 11.

In an exemplary implementation, the second structural layer 22 may include a second electrode layer 221 disposed at a side of the second base substrate 21 facing the first substrate 10, and a second alignment layer 23 is disposed at a side of the second structural layer 22 away from the second base substrate 21.

In an exemplary implementation, the first electrode layer 121 may be a strip electrode, and the second electrode layer 221 may be a surface electrode (whole surface). The first electrode layer 121 and the second electrode layer 221 are configured to form a predetermined electric field between the first electrode layer 121 and the second electrode layer 221, so that the liquid crystal layer 30 forms a liquid crystal lens.

In an exemplary implementation, the first electrode layer 121 and the second electrode layer 221 may be made of a transparent conductive material, such as Indium Tin Oxide (ITO), Indium Zinc Oxide (IZO), Zinc Oxide (ZO), Indium Oxide (IO), or Titanium Oxide (TiO), etc. In some possible exemplary implementations, the first electrode layer 121 and the second electrode layer 221 may be made of a material such as a Carbon Nanotube, a metal nanowire, or a Conductive Polymer, etc., and the first electrode layer 121 and the second electrode layer 221 may be made of a same material, or may be made of different materials, which is not limited in the present disclosure.

In an exemplary implementation, the first insulating layer 122 may be made of a silicon oxide SiOx, a silicon nitride SiNx, or a silicon oxynitride SiON, etc., and may be a single-layer structure, or a multi-layer composite structure. In an exemplary implementation, the first insulating layer may be referred to as a Passivation (PVX) layer.

In an exemplary implementation, the first alignment layer 13 and the second alignment layer 23 are respectively disposed at two sides of the liquid crystal layer 30, and are configured to make liquid crystal molecules in the liquid crystal layer 30 have an initial posture, wherein the initial posture may at least include an alignment pretilt angle.

In an exemplary implementation, the first alignment layer 13 and the second alignment layer 23 may achieve the alignment pretilt angle through rubbing processing, and the first alignment layer 13 and the second alignment layer 23 may be made of polyimide (PI), which has advantages of a good chemical stability, an excellent mechanical property, good insulativity, high temperature resistance, radiation resistance, and the like. In some possible exemplary implementations, the first alignment layer 13 and the second alignment layer 23 may achieve the alignment pretilt angle by Optical Alignment (OA) processing, which is not limited in the present disclosure.

In an exemplary implementation, on a plane parallel to the liquid crystal lens panel, at least one of the first alignment layer 13 and the second alignment layer 23 may include multiple alignment rows, wherein at least two alignment rows have different alignment pretilt angles.

Figure 9:
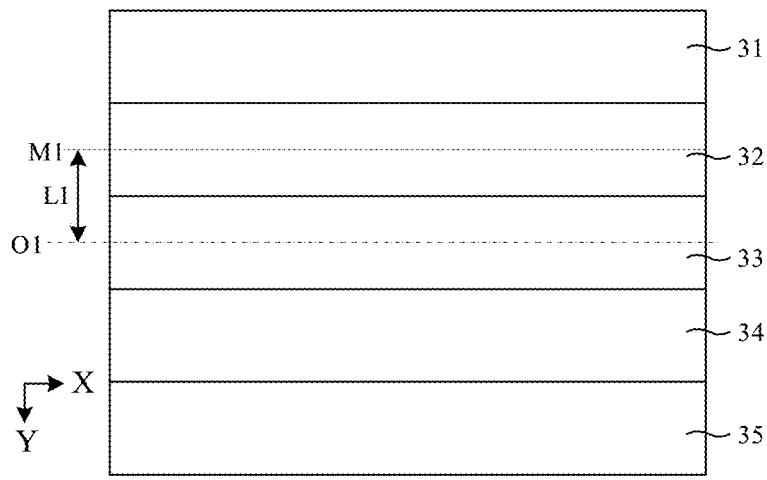
FIG. 9 is a schematic diagram of a structure of multiple alignment rows according to an exemplary embodiment of the present disclosure.

FIG. 9 is a schematic diagram of a structure of multiple alignment rows according to an exemplary embodiment of the present disclosure, by illustrating a structure of five alignment rows. As shown in FIG. 9, the multiple alignment rows may include a first alignment row 31, a second alignment row 32, a third alignment row 33, a fourth alignment row 34, and a fifth alignment row 35 sequentially disposed along a vertical direction Y, wherein each alignment row is a strip shape extending along a horizontal direction X.

In an exemplary implementation, at least two alignment rows may be disposed symmetrically with respect to a first reference line O1, wherein the first reference line O1 may be a straight line extending along the horizontal direction X and passing through a center point of a panel, which is a geometric center of the liquid crystal lens panel. For example, positions and geometric parameters of the first alignment row 31 and the fifth alignment row 35 may be mirror-symmetrical with respect to the first reference line O1. For another example, positions and geometric parameters of the second alignment row 32 and the fourth alignment row 34 may be mirror-symmetrical with respect to the first reference line O1. Yet for another example, the third alignment row 33 may be disposed symmetrically with respect to the first reference line O1, and a first center line M1 of the third alignment row 33 may overlap with the first reference line O1, wherein the first center line M1 is a straight line that bisects the alignment row in the vertical direction Y and extends along the horizontal direction X.

In an exemplary implementation, absolute values of alignment pretilt angles of two alignment rows symmetrically disposed with respect to the first reference line O1 may be same. For example, the first alignment row 31 and the fifth alignment row 35 are mirror-symmetrical with respect to the first reference line O1; an alignment pretilt angle of the first alignment row 31 may be 5°, and an alignment pretilt angle of the fifth alignment row 35 may be −5°, and absolute values of alignment pretilt angles of both are same. In the present disclosure, absolute values of alignment pretilt angles being same is not strictly identical, and there may be a certain tolerance range, for example, within the tolerance range of ±20%.

In an exemplary implementation, an absolute value of an alignment pretilt angle of an alignment row is directly proportional to a first distance L1, wherein the first distance L1 is a distance between the first center line M1 of the alignment row and the first reference line O1, which is a size in the vertical direction Y. For example, a first distance of the first alignment row 31 is greater than a first distance of the second alignment row 32, and an absolute value of an alignment pretilt angle of the first alignment row 31 is greater than an absolute value of an alignment pretilt angle of the second alignment row 32. For another example, a first distance of the fifth alignment row 35 is greater than a first distance of the fourth alignment row 34, and an absolute value of an alignment pretilt angle of the fifth alignment row 35 is greater than an absolute value of an alignment pretilt angle of the fourth alignment row 34.

In an exemplary implementation, taking the first reference line O1 as a classification basis, multiple alignment rows sequentially arranged along the vertical direction Y may be divided into an alignment row located above the first reference line O1 and an alignment row located below the first reference line O1. For example, the first alignment row 31 and the second alignment row 32 are alignment rows located above the first reference line O1, and all regions of the above two alignment rows are located above the first reference line O1. For another example, the fourth alignment row 34 and the fifth alignment row 35 are alignment rows located below the first reference line O1, and all regions of the above two alignment rows are located below the first reference line O1.

In an exemplary implementation, an alignment pretilt angle of an alignment row located above the first reference line O1 may be greater than 0°, and an alignment pretilt angle of an alignment row located below the first reference line O1 may be less than 0°. For example, the alignment pretilt angle of the first alignment row 31 may be 5°, and the alignment pretilt angle of the fifth alignment row 35 may be −5°. For another example, the alignment pretilt angle of the second alignment row 32 may be 2.5°, and the alignment pretilt angle of the fourth alignment row 34 may be −2.5°.

In an exemplary implementation, the multiple alignment rows may also be divided into an alignment row located in a middle region, wherein an orthographic projection of an alignment row located in the middle region on a plane of the liquid crystal lens panel overlaps at least partially with an orthographic projection of the first reference line O1 on the plane of the liquid crystal lens panel. For example, the third alignment row 33 is an alignment row located in the middle region.

In an exemplary implementation, an alignment pretilt angle of the alignment row located in the middle region may be about 0.1° to 1°. For example, the alignment pretilt angle of the alignment row located in the middle region may be about 0.1°.

In an exemplary implementation, when a quantity of alignment rows is even, the even alignment rows may include alignment rows located above the first reference line O1 and alignment rows located below the first reference line O1. When a quantity of alignment rows is odd, the odd alignment rows may include alignment rows located above the first reference line O1, alignment rows located below the first reference line O1, and an alignment row located in the middle region.

In an exemplary implementation, an absolute value of an alignment pretilt angle may be less than or equal to 6°.

In an exemplary implementation, the alignment pretilt angle of the first alignment row 31 may be about 4° to 6°, the alignment pretilt angle of the second alignment row 32 may be about 2° to 3°, the alignment pretilt angle of the third alignment row 33 may be about 0.1° to 1°, the alignment pretilt angle of the fourth alignment row 34 may be about −2° to −3°, and the alignment pretilt angle of the fifth alignment row 35 may be about −4° to −6°. For example, the alignment pretilt angle of the first alignment row 31 may be about 5°, the alignment pretilt angle of the second alignment row 32 may be about 2.5°, the alignment pretilt angle of the third alignment row 33 may be about 0.1°, the alignment pretilt angle of the fourth alignment row 34 may be about −2.5°, and the alignment pretilt angle of the fifth alignment row 35 may be about −5°.

In an exemplary implementation, a quantity of alignment rows may be about 2 to 10.

Figure 10:
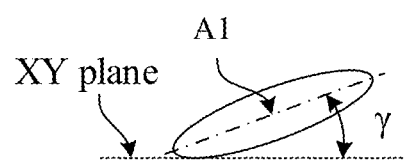
FIG. 10 is a schematic diagram of a pretilt angle of a liquid crystal molecule according to an exemplary embodiment of the present disclosure.

FIG. 10 is a schematic diagram of a pretilt angle of a liquid crystal molecule according to an exemplary embodiment of the present disclosure. As shown in FIG. 10, for the first alignment layer and the second alignment layer subjected to rubbing processing or optical alignment processing, liquid crystal molecules in the liquid crystal layer are arranged according to the alignment pretilt angles of the alignment layers in an initial state without applying a voltage, and an optical axis A1 of the liquid crystal molecule has a tilt angle γ with the plane of the liquid crystal lens panel (XY plane), wherein the tilt angle γ is referred to as a pretilt angle of the liquid crystal molecule.

As shown in FIGS. 7 and 9, a liquid crystal lens panel of a size of 13.5 inches, and a viewing distance of 540 mm are taken as an example. For an existing liquid crystal lens panel in which there is no partition for the alignment layer, when the viewer views a center point of the panel (when the viewer's sight line overlaps with a sight center line O of the panel), a focal length of a liquid crystal lens is 726.61 μm, when the viewer views an upper edge of the panel (the viewer's sight line has an included angle α with the sight center line O of the panel), a focal length of the liquid crystal lens is 688.20 μm, and when the viewer views a lower edge of the panel (the viewer's sight line has an included angle −α with the sight center line O of the panel), a focal length of the liquid crystal lens is 787.71 μm. Since the focal length of the liquid crystal lens is reduced when the viewer views the upper edge of the panel, the focal length of the liquid crystal lens increases when the viewer views the lower edge of the panel, and there is a great difference from the focal length of the liquid crystal lens when the viewer views a center point of the panel, it is resulted in that a 3D imaging effect becomes poor. For the liquid crystal lens panel according to an exemplary embodiment of the present disclosure, the alignment layer is partitioned by designing, the focal length of the liquid crystal lens is increased by increasing the pretilt angle (a positive value), and the focal length of the liquid crystal lens is reduced by reducing the pretilt angle (a negative value), which compensates the focal length of the liquid crystal lens under a relatively large vertical visual angle, and effectively reduces a deviation of the focal length of the liquid crystal lens under a relatively large vertical visual angle from a focal length initially designed, and effectively improving the 3D imaging effect.

A simulation experiment shows that when liquid crystal molecules at the upper edge of the panel have a pretilt angle of 5° or so, and liquid crystal molecules at the lower edge of the panel have a pretilt angle of −5° or so, the focal length of the liquid crystal lens is optimized to be 723.1 μm when the viewer views the upper edge of the panel, and the focal length of the liquid crystal lens is optimized to be 729.90 μm when the viewer views the lower edge of the panel. The optimized focal lengths defer from the focal length initially designed by only 3.29 μm or so, which is within an allowed error range. Therefore, it can be seen that in the present disclosure, a deviation of a focal length of a lens caused by the visual angle characteristics of a liquid crystal in the vertical direction can be effectively improved, and the 3D imaging effect can be effectively improved, through pretilt angle partitioning optimization of the alignment layer.

In an exemplary implementation, the liquid crystal layer is made of a positive liquid crystal. In increasing the focal length by increasing the pretilt angle, and reducing the focal length by reducing the pretilt angle, mentioned in the present disclosure, a specific numerical relationship is related to a property of a liquid crystal material and a specification of the liquid crystal lens, and can be obtained by a simulation calculation according to an actual situation.

The liquid crystal material has wavelength dispersion, and light rays with different wavelengths have different refractive indices when propagating in liquid crystal layer. For example, a refractive index of a certain liquid crystal material for light rays with a wavelength of 436 nm is: $n_o=1.5405$, $n_e=1.9195$; a refractive index of a certain liquid crystal material for a wavelength of 546 nm is: $n_o=1.5263$, $n_e=1.8319$; and a refractive index of a certain liquid crystal material for a wavelength of 680 nm is: $n_o=1.5132$, $n_e=1.7919$. An equivalent focal length of the liquid crystal lens is directly proportional to the refractive index. For light rays of different wavelengths, the focal lengths of the liquid crystal lens are different. The larger the wavelength, the larger the focal length of the liquid crystal lens. When the liquid crystal lens is designed by taking the wavelength of 546 nm (green light) as a central wavelength, a focal length designed is about 725 μm, and an actual focal length is about 731.1 μm. However, the actual focal length of the liquid crystal lens is about 606.2 μm at the wavelength of 450 nm (blue light), and about 790.5 μm at the wavelength of 650 nm (red light). Since light rays of different wavelengths have different deflection situations when passing through the liquid crystal lens, they are no longer parallel during a space propagation, and the liquid crystal lens has different focal lengths, so light rays of different wavelengths cannot converge to a same point after passing through the liquid crystal lens (referred to as dispersion characteristics of the liquid crystal lens), resulting in a color separation of a display picture, and even a confusion of an viewed image.

In an exemplary implementation, on a plane parallel to the liquid crystal lens panel, the first insulating layer may include multiple repetitive units arranged regularly, wherein at least one repetitive unit may include multiple insulating regions, at least two of which have different dielectric constants (permittivities).

Figure 11:
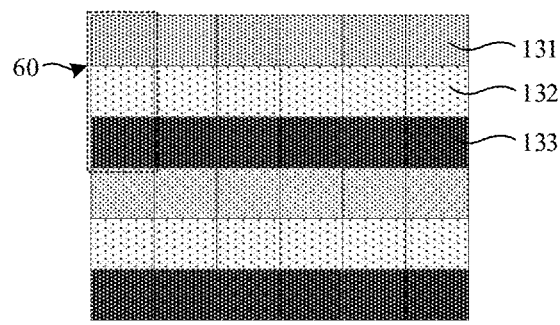
FIG. 11 is a schematic diagram of a planar structure of a first insulating layer according to an exemplary embodiment of the present disclosure.

FIG. 11 is a schematic diagram of a planar structure of a first insulating layer according to an exemplary embodiment of the present disclosure. As shown in FIG. 11, on a plane parallel to the liquid crystal lens panel, the first insulating layer may include multiple repetitive units 60 arranged regularly, wherein at least one repetitive unit 60 may include a first insulating region 131, a second insulating region 132, and a third insulating region 133.

In an exemplary implementation, the first insulating region 131 is configured to perform compensation for dispersion characteristics of a liquid crystal lens corresponding to the first insulating region 131 when light rays of the first wavelength passes through the liquid crystal layer, the second insulating region 132 is configured to perform compensation for dispersion characteristics of a liquid crystal lens corresponding to the second insulating region 132 when light rays of the second wavelength passes through the liquid crystal layer, and the third insulating region 133 is configured to perform compensation for dispersion characteristics of a liquid crystal lens corresponding to the third insulating region 133 when light rays of the third wavelength passes through the liquid crystal layer, so that liquid crystal lenses corresponding to the three insulating regions have basically same focal lengths, and light rays of the three wavelengths may converge to a same point in space after passing through the liquid crystal lens.

In an exemplary implementation, a first insulating region of the first insulating layer has a first dielectric constant, a second insulating region of the first insulating layer has a second dielectric constant, and a third insulating region of the first insulating layer has a third dielectric constant, wherein the first dielectric constant, the second dielectric constant, and the third dielectric constant are different.

In an exemplary implementation, the first wavelength may be greater than the second wavelength, and the first dielectric constant may be greater than the second dielectric constant.

In an exemplary implementation, the second wavelength may be greater than the third wavelength, and the second dielectric constant may be greater than the third dielectric constant.

In an exemplary implementation, the first wavelength may be about 605 nm to 700 nm, the second wavelength may be about 505 nm to 600 nm, and the third wavelength may be about 400 nm to 500 nm.

In an exemplary implementation, the first dielectric constant may be about 5 to 6. For example, for the first insulating region with the central wavelength of 650 nm or so and the first dielectric constant of about 5.5 or so, its focal length may be compensated from 790.5 μm to 725 μm or so.

In an exemplary implementation, the second dielectric constant may be about 3.0 to 3.5. For example, for the second insulating region with the central wavelength of 550 nm or so and the second dielectric constant of about 3.2 or so, its focal length of 725 μm or so may be achieved.

In an exemplary implementation, the third dielectric constant may be about 1.5 to 2.0. For example, for the third insulating region with the central wavelength of 450 nm or so and the third dielectric constant of about 1.7 or so, its focal length may be compensated from 606.2 μm to 725 μm or so.

In an exemplary implementation, a thickness of the first insulating layer may be about 1.0 μm to 2.0 μm. For example, the thickness of the first insulating layer may be about 1.4 μm.

In an exemplary implementation, a function of reducing a voltage of an insulating layer is also related to a thickness of the insulating layer. The greater the thickness of the insulating layer, the greater the function reducing the voltage of an insulating layer, so when a same reducing effect is achieved, a change amount of a dielectric constant may be reduced under a function of a relatively thick insulating layer.

In the present disclosure, partitioning is performed on the first insulating layer, light rays of different wavelengths are correspondingly transmitted by different insulating regions, materials of different insulating regions have different dielectric coefficients, and voltages actually functioning on the liquid crystal layer are adjusted by using the different dielectric coefficients, so that focal lengths of the liquid crystal lens corresponding to the three insulating regions are all the design value, and light rays of the three wavelengths may converge to a same point in space after passing through the liquid crystal lens, thereby achieving compensation on dispersion characteristics of the liquid crystal lens.

Figure 12:
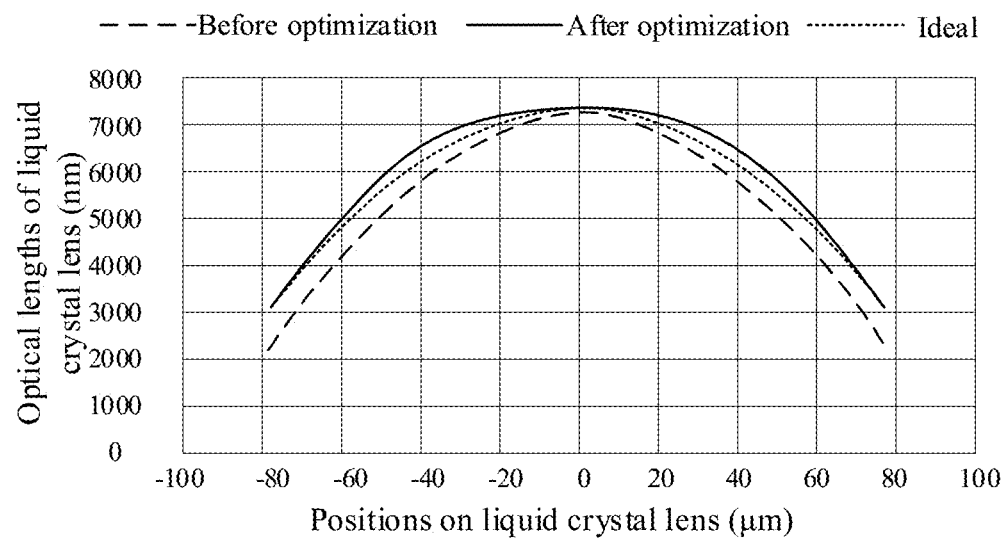
FIG. 12 is a schematic diagram of a simulation result of an equivalent surface shape of a liquid crystal lens.

FIG. 12 is a schematic diagram of a simulation result of an equivalent surface shape of a liquid crystal lens, taking light rays with a wavelength of 450 nm as an example. As shown in FIG. 12, for an existing solution in which the first insulating layer is not partitioned, an actual focal length of the liquid crystal lens is about 606.2 μm, and a deviation between an equivalent surface shape and an ideal surface shape of the liquid crystal lens is about 18.36%, which exceeds an allowed range. For a solution in which the first insulating layer is partitioned in the present disclosure, by changing a dielectric coefficient of an insulating region corresponding to the light rays with the wavelength of 450 nm, without changing other structures, the focal length of the liquid crystal lens is compensated to 725.16 μm, and the deviation between the equivalent surface shape and the ideal surface shape of the liquid crystal lens is reduced to 9.17%.

In an exemplary implementation, forming multiple insulating regions on the first insulating layer may be implemented by a patterning process. For example, a pattern of a first insulating region having a first dielectric constant may be formed by a first patterning process, a pattern of a second insulating region having a second dielectric constant may be formed by a second patterning process, and a pattern of a third insulating region having a third dielectric constant may be formed by a third patterning process.

As can be seen from the structure of the display panel according to an exemplary implementation of the present disclosure, in the present disclosure, a composite partitioning solution is innovatively proposed, in which partitioning is performed according to an alignment pretilt angle for vertical visual angle characteristics, alignment pretilt angles of different partitions are different, and partitioning is performed according to a wavelength for dispersion characteristics, dielectric coefficients of different partitions are different, which effectively improves a 3D display imaging effect based on a liquid crystal lens, and improves a display quality and a character. For partitioning according to the alignment pretilt angle, by increasing a pretilt angle, a focal length of a liquid crystal lens is increased, and by reducing the pretilt angle, the focal length of the liquid crystal lens is reduced, a focal length of the liquid crystal lens under a relatively large vertical visual angle is compensated, and a deviation of the focal length of the liquid crystal lens under the relatively large vertical visual angle from the focal length initially designed is effectively reduced. For partitioning according to the wavelength, light rays of different wavelengths are correspondingly transmitted through different insulating regions, materials of different insulating regions have different dielectric coefficients, and voltages actually functioning on the liquid crystal layer are adjusted by using the different dielectric coefficients, so that focal lengths of the liquid crystal lens corresponding to the three insulating regions are all the design value, and light rays of the three wavelengths may converge to a same point in space after passing through the liquid crystal lens, thereby achieving compensation on dispersion characteristics of the liquid crystal lens. In addition, in an exemplary embodiment of the present disclosure, preparation of the liquid crystal lens panel can be achieved by using a mature preparation device, which has advantages of a relatively little process change, a high compatibility, a simple process realization, wide material sources and a low cost, and an easy implementation, and a good application prospect.

An exemplary embodiment of the present disclosure also provides a display apparatus, including a display panel and an aforementioned liquid crystal lens panel, wherein the liquid crystal lens panel is disposed at a light-emitting side of the display panel.

In an exemplary implementation, the display panel may include multiple pixel islands, wherein at least one pixel island may include at least one pixel unit, and at least one pixel unit may include a first sub-pixel P1 that emits red light rays, a second sub-pixel P2 that emits green light rays, and a third sub-pixel P3 that emits blue light rays.

In an exemplary implementation, positions of the multiple repetitive units of the first insulating layer on the liquid crystal lens panel may correspond with positions of multiple pixel units on the display panel in a one-to-one form. A position and a shape of the first insulating region in a repetitive unit may correspond with a position and a shape of the first sub-pixel in the pixel unit in a one-to-one form, so that the red light rays emitted out from the first sub-pixel are only transmitted through the first insulating region. A position and a shape of the second insulating region in the repetitive unit may correspond with a position and a shape of the second sub-pixel in the pixel unit in a one-to-one form, so that the green light rays emitted out from the second sub-pixel are only transmitted through the second insulating region. A position and a shape of the third insulating region in the repetitive unit may correspond with a position and a shape of the third sub-pixel in the pixel unit in a one-to-one form, so that the blue light rays emitted out from the third sub-pixel are only transmitted through the third insulating region.

Figure 13:
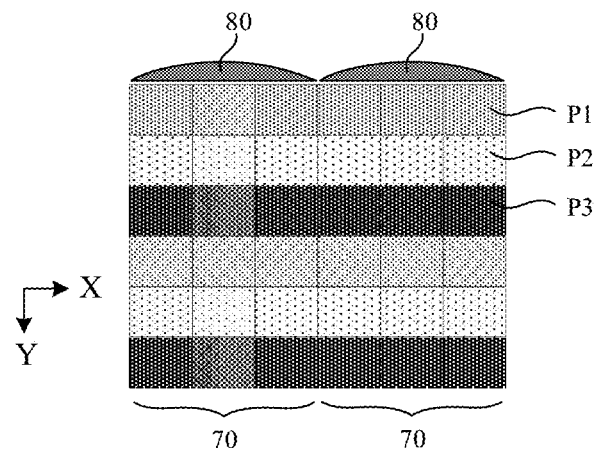
FIG. 13 is a schematic diagram of a corresponding position of a pixel island and a lens according to an exemplary embodiment of the present disclosure.

FIG. 13 is a schematic diagram of a corresponding position of a pixel island and a lens according to an exemplary embodiment of the present disclosure. As shown in FIG. 13, the display panel may include multiple pixel islands 70, wherein each pixel island 70 may include three pixel unit columns, and each pixel unit column may include a first sub-pixel P1, a second sub-pixel P2, and a third sub-pixel P3 arranged periodically in the vertical direction Y. The liquid crystal lens formed by the liquid crystal lens panel is a cylindrical lens 80 extending along the vertical direction Y, wherein a position of each cylindrical lens 80 corresponds with a position of each pixel island 70 in a one-to-one form, i.e., the first sub-pixel P1, the second sub-pixel P2, and the third sub-pixel P3 in each pixel island 70 correspond to a same cylindrical liquid crystal lens.

In an exemplary implementation, the display apparatus may be any product or component with a display function such as a mobile phone, a tablet computer, a television, a display, a laptop computer, a digital photo frame, or a navigator, etc.

Although the implementations disclosed in the present disclosure are as above, the described contents are only implementations used for convenience of understanding the present disclosure and are not intended to limit the present disclosure. Any skilled in the art to which the present disclosure pertains, without departing from the spirit and scope disclosed in the present disclosure, may make any modifications and changes in a form and detail of implementation. However, the scope of patent protection of the present application should still be subject to the scope defined by the appended claims.

The invention claimed is:

1. A liquid crystal lens panel, comprising a first substrate and a second substrate disposed oppositely, and a liquid crystal layer disposed between the first substrate and the second substrate, wherein the first substrate comprises a first structural layer disposed at a side of a first base substrate facing the second substrate and a first alignment layer disposed at a side of the first structural layer away from the first base substrate, and the second substrate comprises a second structural layer disposed at a side of a second base substrate facing the first substrate and a second alignment layer disposed at a side of the second structural layer away from the second base substrate; at least one of the first alignment layer and the second alignment layer comprises a plurality of alignment regions on a plane parallel to the liquid crystal lens panel, wherein at least two alignment regions have different alignment pretilt angles;

wherein the first structural layer comprises a first electrode layer disposed at a side of the first base substrate facing the second substrate and a first insulating layer disposed at a side of the first electrode layer away from the first base substrate; the second structural layer comprises a second electrode layer disposed at a side of the second base substrate facing the first substrate; the first electrode layer is a strip electrode, and the second electrode layer is a surface electrode;

wherein on a plane parallel to the liquid crystal lens panel, the first insulating layer comprises a plurality of repetitive units arranged regularly, wherein at least one repetitive unit comprises a plurality of insulating regions, at least two of which have different dielectric constants;

wherein the repetitive unit comprises a first insulating region, a second insulating region, and a third insulating region, wherein the first insulating region is configured to perform compensation for dispersion characteristics of a liquid crystal lens corresponding to the first insulating region when light rays of a first wavelength passes through the liquid crystal layer, the second insulating region is configured to perform compensation for dispersion characteristics of a liquid crystal lens corresponding to the second insulating region when light rays of a second wavelength passes through the liquid crystal layer, and the third insulating region is configured to perform compensation for dispersion characteristics of a liquid crystal lens corresponding to the third insulating region when light rays of a third wavelength passes through the liquid crystal layer, to make liquid crystal lenses corresponding to the three insulating regions have a same focal length.

2. The liquid crystal lens panel of claim 1, wherein the plurality of alignment regions comprise a plurality of alignment rows sequentially disposed along a vertical direction, and at least two of the plurality of alignment rows have different alignment pretilt angles, and the vertical direction is a vertical direction when the liquid crystal lens panel is viewed by a viewer.

3. The liquid crystal lens panel of claim 2, wherein at least two alignment rows are disposed symmetrically with respect to a first reference line, wherein absolute values of alignment pretilt angles of the two alignment rows are same; the first reference line is a straight line extending along a horizontal direction and passing through a center point of the panel, wherein the center point of the panel is a geometric center of the liquid crystal lens panel.

4. The liquid crystal lens panel of claim 3, wherein an absolute value of an alignment pretilt angle of an alignment row is directly proportional to a first distance, the first distance is a distance between a first center line of the alignment row and the first reference line, and the first center line is a straight line that bisects the alignment row in the vertical direction and extends along the horizontal direction.

5. The liquid crystal lens panel of claim 3, wherein an alignment pretilt angle of an alignment row located above the first reference line is greater than 0°, an alignment pretilt angle of an alignment row located below the first reference line is less than 0°, and an alignment pretilt angle of an alignment row located on the first reference line is 0.1° to 1°.

6. The liquid crystal lens panel of claim 2, wherein absolute values of alignment pretilt angles of the plurality of alignment rows are less than or equal to 6°.

7. The liquid crystal lens panel of claim 1, wherein the first wavelength is greater than the second wavelength, and the second wavelength is greater than the third wavelength; the first insulating region has a first dielectric constant, the second insulating region has a second dielectric constant, and the third insulating region has a third dielectric constant, wherein the first dielectric constant is greater than the second dielectric constant, and the second dielectric constant is greater than the third dielectric constant.

8. The liquid crystal lens panel of claim 7, wherein the first wavelength is 605 nm to 700 nm, and the first dielectric constant is 5 to 6.

9. The liquid crystal lens panel of claim 7, wherein the second wavelength is 505 nm to 600 nm, and the second dielectric constant is 3.0 to 3.5.

10. The liquid crystal lens panel of claim 7, wherein the third wavelength is 400 nm to 500 nm, and the third dielectric constant is 1.5 to 2.0.

11. A display apparatus, comprising a display panel and a liquid crystal lens panel according to claim 1, wherein the liquid crystal lens panel is disposed at a light-emitting side of the display panel.

12. The display apparatus of claim 11, wherein the display panel comprises a plurality of pixel units arranged regularly, wherein at least one pixel unit comprises a first sub-pixel that emits light rays of a first color, a second sub-pixel that emits light rays of a second color, and a third sub-pixel that emits light rays of a third color, and in a repetitive unit of the liquid crystal lens panel, a first insulating region corresponds to a position of the first sub-pixel, a second insulating region corresponds to a position of the second sub-pixel, and a third insulating region corresponds to a position of the third sub-pixel.

13. The display apparatus of claim 11, wherein the plurality of alignment regions comprise a plurality of alignment rows sequentially disposed along a vertical direction, and at least two of the plurality of alignment rows have different alignment pretilt angles, and the vertical direction is a vertical direction when the liquid crystal lens panel is viewed by a viewer.

14. The display apparatus of claim 13, wherein at least two alignment rows are disposed symmetrically with respect to a first reference line, wherein absolute values of alignment pretilt angles of the two alignment rows are same; the first reference line is a straight line extending along a horizontal direction and passing through a center point of the panel, wherein the center point of the panel is a geometric center of the liquid crystal lens panel.

* * * * *